Patented Aug. 26, 1941

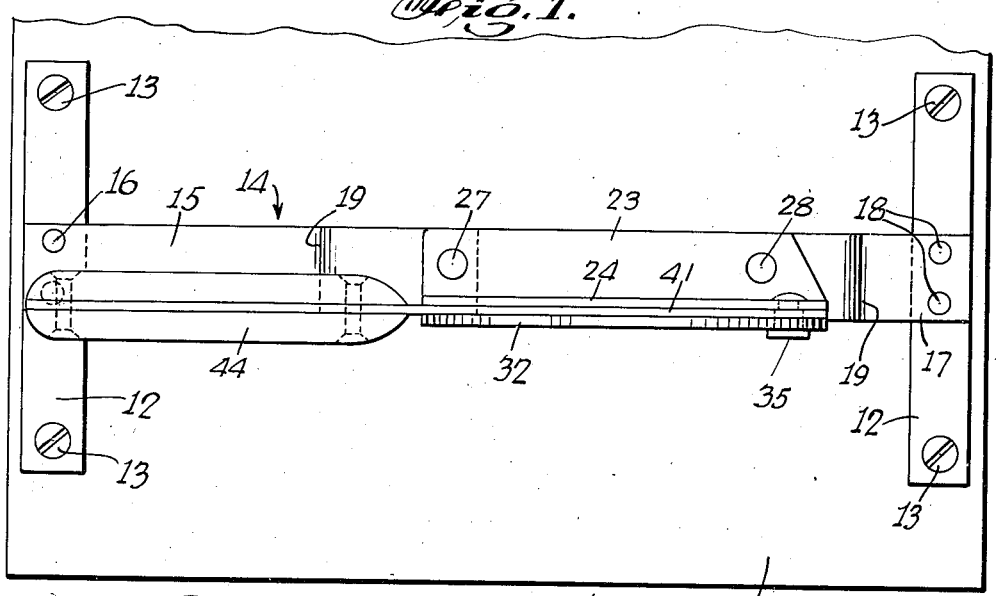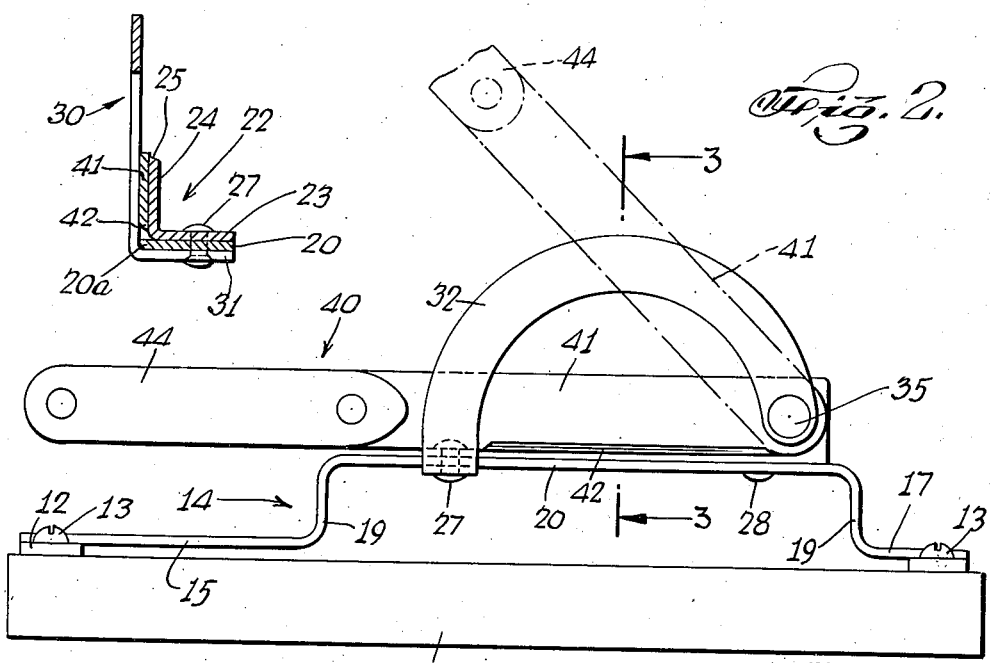

2,254,188

UNITED STATES PATENT OFFICE 2,254,188

CUTTING OFF MACHINE

William B. Poppenga, Lennox, S. Dak.

Application April 15, 1940, Serial No. 329,753

3 Claims. (Cl. 17—12)

This invention relates to cutting off machines. It is particularly directed to a handy cutting off machine which may be used for cutting off heads of chickens, cleaning fish, slicing meat and other little cutting off jobs.

An object of this invention is to provide a manually operated cutting off machine of the character described, having means adapted to shear a large variety of articles or objects, and including a movable shearing blade and a guide therefor.

Another object of this invention is to provide a strong, rugged, durable and compact machine of the character described, which shall be easy to manipulate, relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of a cutting off machine embodying the invention;

Fig. 2 is a side elevational view thereof; and

Fig. 3 is a cross-sectional view taken on line 3—3 of Fig. 2.

Referring now in detail to the drawing, 10 designates a cutting off machine embodying the invention, for cutting off heads of chickens, for cleaning fish, slicing meat and for many other little cutting off jobs.

The machine 10 comprises a base 11 which may be made of wood, or any other material. Attached to the top of the base 11, are a pair of parallel, spaced, metal strips or bars 12, which may be secured to the base by screws 13.

Interconnecting the mid portions of the metal strips 12, is a metal strap 14 disposed at right angles to said strips and having a horizontal portion 15 at one end, the outer end of which contacts the top of one strip, and is attached thereto, by rivets 16. At the other end of the strap 14 is a horizontal portion 17 attached to the top of the other strip 12, by rivets 18.

Extending upwardly from portions 15 and 17 are vertical portions 19 interconnected by a raised horizontal portion 20. Portion 15 of member 14 is longer than portion 17 thereof. Member 14 is made from an elongated bar of metal, and is preferably rigid.

Fixed to the upper surface of portion 20 of strap 14, is an elongated member 22 of angle shaped cross-section having a horizontal portion 23 contacting the upper surface of said portion 20, and an upwardly extending wall 24 spaced from the front edge 20a of said portion 20. At the upper end of wall 24 is a horizontal shearing edge 25. Wall 23 is fixed to portion 20 of strap 14 by means of a pair of rivets 27 and 28.

Mounted on portion 20 of strap 14, and on wall 24 of member 22, is a guide member 30. Said guide member 30 has a foot portion 31 contacting the underside of portion 20, and fixed thereto by the rivet 27. Extending upwardly from the foot 31 is a curved portion 32 disposed in a vertical plane and somewhat less than semi-circular in extent. The outer end of curved wall 32 is interconnected to wall 24 by a pivot pin 35. Wall 32 is in a plane spaced from the wall 24, for the purpose hereinafter appearing.

Pivoted on the pivot pin 35 is one end of a movable shearing element 40. The shearing element 40 comprises a metal blade 41 having a shearing edge 42 at its lower end adapted to engage with the shearing edge 25 of wall 24. At the outer end of the blade 41 is a handle 44 projecting beyond portion 20 of strap 14 and overlying portion 15 thereof. The handle 44 is thus spaced above portion 15 of strap 14, so that when the handle is held by the hand, the space between the handle and portion 15 of the strap, will accommodate the fingers of the hand.

The operation of the device will now be described:

The cutting element 40 is first raised to the dot, dash line position shown in Fig. 2. The article to be cut is then inserted between wall 24 and the curved wall 32 and beneath the blade 41. The cutting element 40 is then lowered to shear the article.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A cutting off machine comprising a member having horizontal end portions and a raised intermediate portion, a member fixed to the raised portion and having a vertical wall formed with an upper shearing edge, a guide member having a foot contacting the underside of the raised portion, and fixed thereto, and having a curved vertical wall substantially semi-circular in extent, the outer end of said curved wall being connected to said first vertical wall by a pivot pin, said curved wall being spaced from and parallel to said vertical wall, a cutting element comprising a blade pivoted at one end on said pivot pin, and disposed between the curved wall of said guide and the vertical wall of said member, and having a lower shearing edge adapted to cooperate with the first shearing edge.

2. A cutting off machine comprising a member having horizontal end portions and a raised intermediate portion, a member fixed to the raised portion and having a vertical wall formed with an upper shearing edge, a guide member having a foot contacting the underside of the raised portion, and fixed thereto, and having a curved vertical wall substantially semi-circular in extent, the outer end of said curved wall being connected to said first vertical wall by a pivot pin, said curved wall being spaced from and parallel to said vertical wall, a cutting element comprising a blade pivoted at one end on said pivot pin, and disposed between the curved wall of said guide and the vertical wall of said member, and having a lower shearing edge adapted to cooperate with the first shearing edge, and a handle on said cutting element extending beyond said raised portion and overlying and being spaced from one of said horizontal portions.

3. A cutting off device comprising a member having horizontal end portions and a raised intermediate portion, a member fixed to the raised portion and having a vertical wall formed with an upper shearing edge, a guide member having a foot contacting the underside of the raised portion, and fixed thereto, and having a curved vertical wall substantially semi-circular in extent, the outer end of said curved wall being connected to said first vertical wall by a pivot pin, said curved wall being spaced from and parallel to said vertical wall, a cutting element comprising a blade pivoted at one end on said pivot pin, and disposed between the curved wall of said guide and the vertical wall of said member, and having a lower shearing edge adapted to cooperate with the first shearing edge, and a handle on said cutting element extending beyond said raised portion and overlying and being spaced from one of said horizontal portions, one of said horizontal end portions being longer than the other horizontal end portion.

WILLIAM B. POPPENGA.